(12) United States Patent
Rupp et al.

(10) Patent No.: US 6,225,722 B1
(45) Date of Patent: May 1, 2001

(54) ELECTRIC MACHINE WITH A ROTOR THAT ROTATES AROUND A STATOR

(75) Inventors: Bernhard Rupp, Sulzfeld; Gerd Knoepfel, Buehl, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/529,949

(22) PCT Filed: Jun. 8, 1999

(86) PCT No.: PCT/DE99/01665

§ 371 Date: Jun. 5, 2000

§ 102(e) Date: Jun. 5, 2000

(87) PCT Pub. No.: WO00/11776

PCT Pub. Date: Mar. 2, 2000

(30) Foreign Application Priority Data

Aug. 21, 1998 (DE) .............................. 198 38 038

(51) Int. Cl.$^7$ ...................................................... H02K 5/00
(52) U.S. Cl. .............................. 310/91; 310/258; 310/89; 310/216
(58) Field of Search ................................. 310/91, 89, 259, 310/258, 216, 218

(56) References Cited

U.S. PATENT DOCUMENTS

| 5,461,271 | * | 10/1995 | Asama et al. | 310/91 |
| 5,578,883 | * | 11/1996 | Sakashita et al. | 310/91 |
| 5,747,908 | * | 5/1998 | Saneshige et al. | 310/91 |

* cited by examiner

*Primary Examiner*—Nestor Ramirez
*Assistant Examiner*—Thanh Lam
(74) *Attorney, Agent, or Firm*—Ronald E. Greigg; Edwin E. Greigg

(57) ABSTRACT

A brushless direct current electric machine, comprising a stator with a hub and first stator pole teeth, which extend radially outward from this hub and have excitation coils, and with second stator pole teeth, which do not have excitation coils, interposed the first stator pole teeth, and has a rotor equipped with permanent magnets, which can rotate around the stator. The electric machine also has a base plate in which a rotor shaft bearing is inserted directly into the hub of the stator which fastens each of the second stator teeth to the base plate. The base plate is made of sheet metal and has supporting nipples oriented toward the second stator pole teeth. The second stator pole teeth have holes through which screws extend, which are screwed into the supporting nipples. The electric machine operates as a brushless direct current motor and is manufactured inexpensively.

9 Claims, 2 Drawing Sheets

ELECTRIC MACHINE WITH A ROTOR THAT ROTATES AROUND A STATOR

PRIOR ART

The invention is based on an electric machine, in particular an electric motor, which has a rotor that rotates around a stator.

The references U.S. Pat. No. 4,337,491 A, U.S. Pat. No. 5,220,227 A, EP 0 236 467 B1, EP 0 433 479 A1, and DE 41 22 529 A1 have disclosed well-known machines which have a stator, a rotor that rotates around the stator, a rotor shaft that is supported so that the rotor shaft can rotate centrally in relation to the stator, rotor shaft bearing means, a base plate aligned crosswise in relation to the rotor shaft and thereby adjacent to the stator, and a supporting means that protrudes from the base plate in order to support the stator and the at least one rotor shaft bearing means. The supporting means is respectively comprised after the fashion of a tubular element that protrudes from the base plate, has the respective stator slid onto it, and has the respective rotor shaft bearing means built into it. Depending on whether the base plate is cast or is pressed out of sheet metal, the respective tubular supporting means can be cast in one piece with the base plate, or can be flange-mounted onto the respective base plate in the form of a relatively thin-walled tube and secured there by means of screws or press-fitted into a receiving bore disposed in the base plate. Clearly, the tubular supporting means must be precisely manufactured both externally and internally in order to both support the stators and contain the rotor shaft bearing means in a vibrationally secure manner. In this connection, the stators are made up of layers of stamped sheet metal cutouts and have an opening on the inside which is adapted to the tubular supporting means. Around an opening of this kind, the stamped sheet metal cutouts function as a stationary hub with stator pole teeth extending radially outward from the hub. For example, each stator pole tooth can carry an excitation winding or, according to EP 0 433 479 A1 and DE 41 22 529 A1, half as many excitation coils as stator pole teeth can be provided so that as can be clearly inferred from EP 0 433 479 A1, there can be a pole tooth with no winding between each pair of pole teeth that carry excitation coils. The rotor shaft bearing means are comprised of pairs of ball bearings, pairs of externally cylindrical slide bearing bushes, pairs of externally dome-shaped slide bearing bushes, or a single tubular bearing bushing that is embodied as elongated. The rotors contain permanently magnetized components in essentially cup-like component holders. These component holders are also referred to as pole cups.

ADVANTAGES OF THE INVENTION

The electric machine according to the invention includes a rotor that rotates around a stator and has an the advantage that a vibrational damping is achieved in a simple manner since half of the stator pole teeth are fastened to the base plate and as a result, these stator pole teeth are vibrationally damped and a central supporting tube, which according to the prior art protrudes from the base plate, is superfluous. The vibrationally damped stator pole teeth produce less radiation of noise than freestanding stator pole teeth from the prior art.

Advantageous improvements and updates of the electric machine are possible through the measures taken hereinafter.

The features set forth produce a reasonably priced base plate that can be manufactured out of sheet metal and has supporting means.

The features also produce a suitable exemplary embodiment, in particular for the use of a base plate made of sheet metal.

Further, the features set forth produce an advantage that magnetic flux through the stator pole teeth does not permit the production of eddy currents, which start from the stator pole teeth, pass through the base plate, and travel back to the stator pole teeth. The prevention of these eddy currents prevents the unnecessary consumption of electrical energy.

Other features produce a reasonably priced construction for supporting the armature shaft, in particular when the electric machine is a so-called small-power motor. If the tube is sintered out of bearing metal, another advantage is comprised in that a relatively greater store of lubricant can be built into the electric machine without otherwise conventional auxiliary means such as felt inserts.

Still further features achieve the advantage that if the stator is built into the base plate, an axially precise alignment takes place rapidly so that after this, only the rotational alignment of the stator in relation to the base plate has to be carried out.

BRIEF DESCRIPTION OF THE DRAWINGS

The electrical machine according to the invention is schematically depicted in the drawings and will be described in detail below.

DESCRIPTION OF THE EXEMPLARY EMBODIMENT

Figure 1:
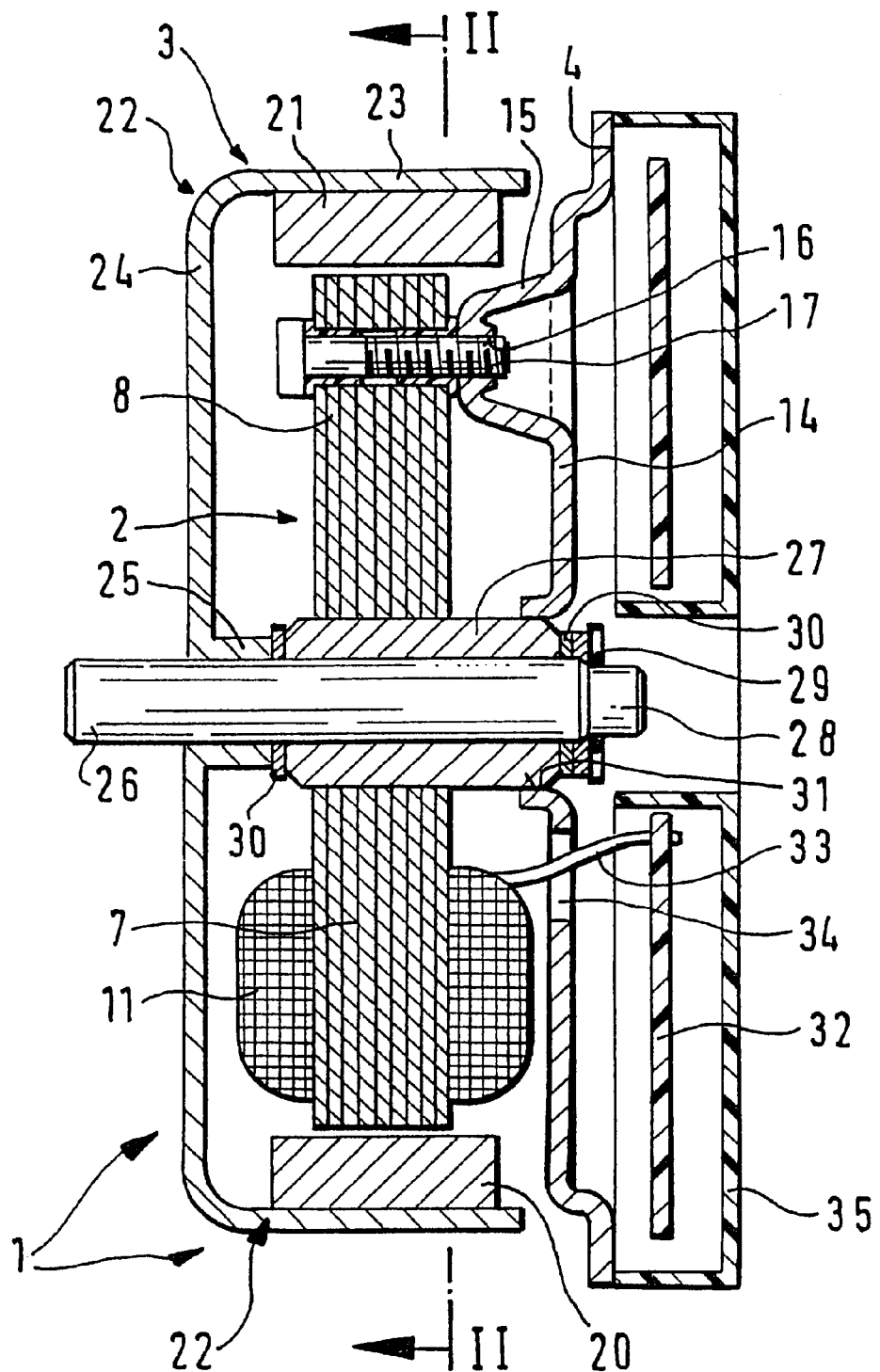
FIG. 1 shows a longitudinal section through the electric machine according to the invention.
Figure 2:
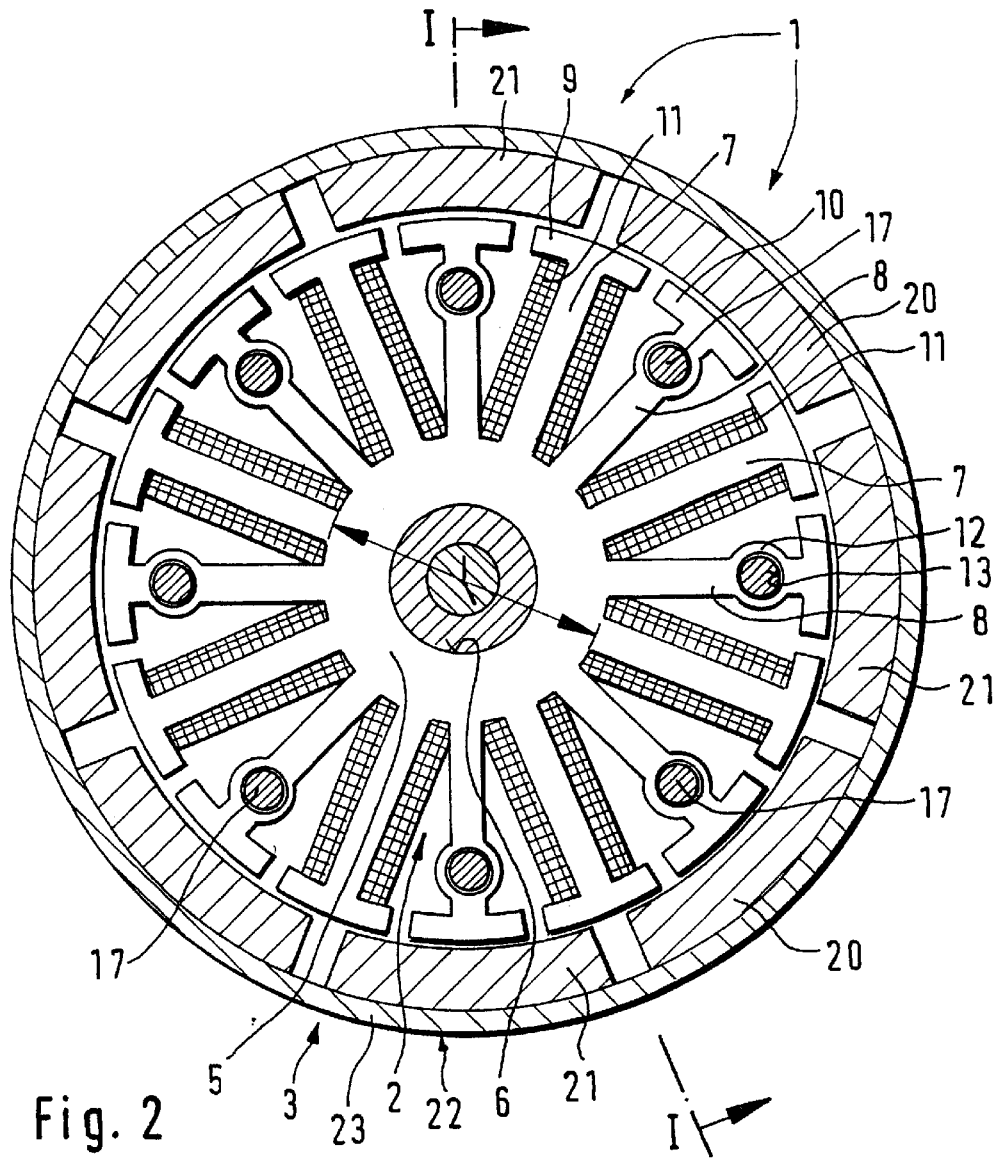
FIG. 2 shows a cross section through the machine according to the invention, in accordance with FIG. 1.

The electric machine 1 according to FIGS. 1 and 2, which can, for example, be operated as an electric motor, has a stator 2, a rotor 3, and a base plate 4.

As can be seen from FIG. 2, the stator 2 has a center part 5 that is embodied after the fashion of a hub, with a central opening 6, and has first stator pole teeth 7 and second stator pole teeth 8 extending from this hub 5 in alternating fashion. For example, the first stator pole teeth can have stator pole shoes 9 and the second stator pole teeth 8 can have additional stator pole teeth 10.

Excitation coils 11 extend around the first stator pole teeth 7.

The second stator pole teeth 8 have widenings 12 in the form of fastening eyes and have through openings 13 in alignment with these widenings 12. As mentioned above in the introduction to the specification, the stator is made up of layers of stamped sheet metal cutouts so that in a technically favorable fashion, the holes 13 can also be produced during the stamping.

The base plate 4 shown in the sectional view in FIG. 1 has a plate-like part 14, from which supporting means of the stator 2, embodied here in the form of nipples 15, protrude toward the stator 2. In the longitudinal section according to FIG. 1, only one such nipple 15 is represented. However, because eight second stator pole teeth 8 are shown in FIG. 2, additional nipples 15 must be imagined in FIG. 1 behind the intersecting plane depicted. In the exemplary embodiment, the nipple 15 has a threaded hole 16 for containing a screw 17, which has previously been slid through a hole 13 of the stator 2 that is placed against the nipple 15. As can be seen in FIG. 2, eight of these screws 17 are provided in the current example. In order to electrically insulate the second stator pole teeth 8 from the nipples 5 and thereby from the plate-like part 14 of the base plate 4 that is pressed out of sheet metal, collar bushings 18 made of an insulating material are inserted between the screws 17 and the second stator pole teeth 8.

Figure 3:
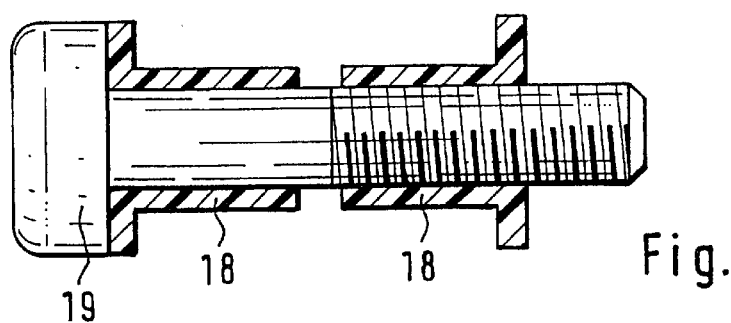
FIG. 3 shows an enlarged detail from FIG. 1.

These collar bushings 18 are shown enlarged in FIG. 3. It can be easily inferred from FIG. 3 that the second stator pole teeth 8 are insulated in relation to the screw 17, its screw head 19, and the nipple 15. The insulating collar bushings 18 prevent current flux paths from a stator pole tooth, through the base plate, and back to another stator pole tooth and thereby suppress a production of short circuit flows and eddy currents, which would lead to the loss of electrical energy in the operation of the motor.

In lieu of the screws, which in this instance are made of metal for strength reasons, naturally other connecting means can be alternatively used as well, such as rivets made of metal, which are not shown since they are well known. With the use of metal as a riveting material, naturally insulation means are also used which are identical or similar to the collar bushings 18.

The rotor 3 is comprised of permanent magnets 20 and 21 and a pole cup 22 in which the permanent magnets 20 and 21 are fastened, for example glued. To this end, the pole cup 22 is embodied in the form of a cylindrical tube 23 in the vicinity of the permanent magnets 20 and 21 and has a wall 24 lateral to this, which leads to a hub 25. The hub 25 is aligned equiaxially to the cylindrical tube 23 and contains a rotor shaft 26. The rotor shaft 26 extends through the stator 2 and is supported in rotary fashion by means of rotor shaft bearing means 27, which are embodied here in the form of a relatively long slide bearing bushing and in this manner, constitute an integral component in lieu of the pairs of bearing bushings that have become well known in the prior art and are associated with a supporting body. For example, the integral component 27 is comprised of sintered bearing material and is impregnated with lubricant. Preferably, sliding disks 30 are inserted between these rotor shaft bearing means 27, which are embodied as an integral component, and the hub 25 on the one side and between these rotor shaft bearing means 27 and an axial securing ring 29 disposed on a rotor shaft end 28 on the other side.

The rotor shaft bearing means 27 embodied as an integral component are inserted in a stationary fashion into the opening 6 of the stator 2. Since the stator 2, as has been described above, is for its part already connected to the nipples 15 of the base plate 4, the stator 2 and the nipples 15 are the supporting means for the rotor shaft bearing means 27. The stator 2 and the rotor shaft bearing means 27 can be united before the stator 2 is fastened to the base plate 4. In order to make it easier to align the holes 13 of the stator 2 in relation to the nipples 15, the base plate 4 has a centering opening 31 in the center of the plate-like part 14, and an elongated section of the rotor shaft bearing means 27 disposed on the rotor shaft end 28 can be inserted into this centering opening 31.

The base plate 4 is associated with a printed circuit board 32, which is shown in a very schematic form and has passive and active electrical elements, not shown, such as resistors and transistors, and is connected to the excitation coils 11 by more than one connecting wire 33. In order to route the connecting wire 33 through the base plate 4, at least one opening 34 is disposed in the plate-like part 14. A covering cap 35 that covers the printed circuit board 32 is placed on the base plate 4 in order to protect the electrical components, not shown.

The foregoing relates to a preferred exemplary embodiment of the invention, it being understood that other variants and embodiments thereof are possible within the spirit and scope of the invention, the latter being defined by the appended claims.

What is claimed is:

1. An electrical machine comprising a stator with a center part that forms a hub (5) and has a central opening (6), first stator pole teeth (7) and second stator pole teeth (8) extending radially outward from said opening (6), excitation coils (11) that encompass the first stator pole teeth (7), a rotor that is supported by a rotor shaft (26), the rotor shaft is aligned centrally in relation to the stator and the stator rotates around the rotor shaft, a base plate, a supporting means for the stator and for rotor shaft bearing means (27) that contain the rotor shaft in rotary fashion, the supporting means associated with the stator (2) are comprised of supporting nipples (15) extending from the base plate into projections of each second stator pole tooth (8), the supporting nipples (15) are connected to each of the respective second stator pole teeth (8), and that the supporting means associated with the rotor shaft bearing means (27) is the hub (25) of the stator (2).

2. The electric machine according to claim 1, in which the base plate (4) is made of sheet metal and that the supporting nipples (15) protrude from the base plate (4, 14) and are attached to the second stator pole teeth (8).

3. The electric machine according to claim 2, in which for connection to the supporting nipples (15), the second stator pole teeth (8) have axially parallel holes (13) and the supporting nipples (15) have congruently aligned holes (16), through which connecting means (18, 19) are inserted.

4. The electric machine according to claim 3, in which the holes (16) in the supporting nipples (15) are embodied as threaded holes and the connecting means are embodied as screws (17) made of metal with surrounding electrical insulators (18).

5. The electric machine according to claim 3, in which the connecting means are embodied as rivets made of metal with surrounding electrical insulators (18).

6. The electric machine according to claim 4, in which the electrical insulators (18) are inserted between the stator (2) and the base plate (4), and between the stator (2) and the connecting means (17).

7. The electric machine according to claim 5, in which the electrical insulators (18) are inserted between the stator (2) and the base plate (4), and between the stator (2) and the connecting means (17).

8. The electric machine according to claim 1, in which the rotor shaft bearing means (27) are embodied as a tubular component made of bearing metal and that this component is disposed in stationary fashion in the opening (6) of the stator (2).

9. The electric machine according to claim 8, in which the base plate (4) has a centering opening (31) associated with the rotor shaft bearing means (27) and the rotor shaft bearing means (27) protrude into the centering opening (31).

* * * * *